US009519191B2

(12) United States Patent
Zheng

(10) Patent No.: US 9,519,191 B2
(45) Date of Patent: Dec. 13, 2016

(54) LIQUID CRYSTAL PANEL AND THE ARRAY SUBSTRATE THEREOF

(71) Applicant: Shenzhen China Star Optoelectronics Technology Co., Ltd., Shenzhen, Guangdong (CN)

(72) Inventor: Hua Zheng, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 150 days.

(21) Appl. No.: 14/425,623

(22) PCT Filed: Oct. 28, 2014

(86) PCT No.: PCT/CN2014/089711
§ 371 (c)(1),
(2) Date: Mar. 3, 2015

(87) PCT Pub. No.: WO2016/061833
PCT Pub. Date: Apr. 28, 2016

(65) Prior Publication Data
US 2016/0246127 A1    Aug. 25, 2016

(30) Foreign Application Priority Data

Oct. 22, 2014   (CN) .......................... 2014 1 0567959

(51) Int. Cl.
*G02F 1/133*      (2006.01)
*G02F 1/1343*     (2006.01)
(Continued)

(52) U.S. Cl.
CPC ....... *G02F 1/134309* (2013.01); *G02F 1/1343* (2013.01); *G02F 1/1368* (2013.01);
(Continued)

(58) Field of Classification Search
CPC .................................................. G02F 1/13306
See application file for complete search history.

(56) References Cited

U.S. PATENT DOCUMENTS 7,834,968 B2    11/2010  Tsuchiya et al.
9,196,736 B2 *  11/2015  Li .................... H01L 29/78669
(Continued)

FOREIGN PATENT DOCUMENTS

CN        101546073 A    9/2009
CN        102073180 A    5/2011
(Continued)

Primary Examiner — Timothy L Rude
(74) Attorney, Agent, or Firm — Andrew C. Cheng

(57) ABSTRACT

A liquid crystal panel and an array substrate are disclosed. The array substrate includes a plurality of pixel cells. Pixel electrodes of each of the pixel cells connect to at least one scanning line and two data lines correspondingly. The two data lines are parallel and spaced apart from each other, and each of the pixel cells is arranged symmetrically along an axis parallel to the two data lines. In this way, the ports corresponding to the intersection of the scanning lines and the adjacent data lines are at the same height to ensure that the pixel cells may be precisely engaged with each other so as to enhance the flexibility of the pixel arrangement.

16 Claims, 5 Drawing Sheets

(51) Int. Cl.
*G02F 1/1335* (2006.01)
*G02F 1/1368* (2006.01)
*G02F 1/1362* (2006.01)

(52) U.S. Cl.
CPC .... *G02F 1/13306* (2013.01); *G02F 1/133512* (2013.01); *G02F 1/133514* (2013.01); *G02F 1/136286* (2013.01); *G02F 1/1362* (2013.01)

(56) References Cited

U.S. PATENT DOCUMENTS

| | | | |
|---|---|---|---|
| 2002/0057411 A1 | 5/2002 | Kim et al. | |
| 2009/0086149 A1* | 4/2009 | Kim | G02F 1/134363 349/144 |
| 2011/0317105 A1 | 12/2011 | Miyazaki | |
| 2011/0317119 A1 | 12/2011 | Jung et al. | |
| 2015/0042939 A1* | 2/2015 | Park | G02F 1/134336 349/144 |
| 2015/0049289 A1* | 2/2015 | Jang | G02F 1/133707 349/142 |
| 2015/0092132 A1* | 4/2015 | Kang | H01L 27/1259 349/43 |
| 2015/0192812 A1* | 7/2015 | Hwang | G02F 1/134309 349/33 |
| 2015/0198846 A1* | 7/2015 | Lim | G02F 1/133788 349/123 |
| 2015/0236042 A1* | 8/2015 | Peng | H01L 27/124 257/72 |
| 2015/0268517 A1* | 9/2015 | Song | G02F 1/134309 349/43 |
| 2016/0124276 A1* | 5/2016 | Chen | G02F 1/134336 349/38 |
| 2016/0154281 A1* | 6/2016 | Kwon | G02F 1/134309 257/72 |
| 2016/0274431 A1* | 9/2016 | Du | G02F 1/136286 |

FOREIGN PATENT DOCUMENTS

| | | |
|---|---|---|
| CN | 102117602 A | 7/2011 |
| CN | 102231030 A | 11/2011 |
| CN | 103353698 A | 10/2013 |
| CN | 104062822 A | 9/2014 |
| JP | 2008180951 A | 8/2008 |

* cited by examiner

LIQUID CRYSTAL PANEL AND THE ARRAY SUBSTRATE THEREOF

BACKGROUND OF THE INVENTION

1. Field of the Invention

The present disclosure relates to liquid crystal display technology, and more particularly to a liquid crystal panel and the array substrate thereof.

2. Discussion of the Related Art

With respect to current pixel arrangement of liquid crystal panels, a plurality of pixel cells are duplicatedly arranged. For instance, the pixel cells 10 of FIG. 1, as indicated by dashed lines, are arranged in a matrix form. Also referring to FIG. 2, two ends (A, B) of the scanning line 11 of each of the pixel cells 10 have to be at the same height. That is, the two ends (A, B) of the scanning line 11 have to be on the same horizontal line. Obviously, the flexibility of the above arrangement is not good enough, and cannot be adopted when the two ends (A, B) of the scanning line 11 have to be at different height.

SUMMARY

In order to overcome the above-mentioned problem, one liquid crystal panel and the array substrate thereof for enhancing the flexibility of the pixel arrangement will be described hereinafter.

In one aspect, an array substrate includes: a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines; within each of the pixel cells, ports corresponding to the intersections of at least one scanning and the two data lines and the intersections of the at least one scanning and the axis are not on the same horizontal line; and wherein each of the pixel cells correspondingly connects to two spaced, parallel scanning lines, each of the pixel cells includes two pixel electrodes arranged at two sides of the axis, and the two pixel electrodes correspondingly connect to two scanning lines.

Wherein each of the pixel electrodes includes a first area and a second area respectively arranged at two sides of the two scanning lines.

Wherein each of the pixel cells further includes a transparent area arranged between the first area and the second area of the two pixel electrodes.

Wherein each of the pixel cells further includes two thin film transistors (TFTs) for correspondingly driving the two pixel electrodes, structures of the two TFTs are different, each of the two TFTs includes a gate, a source, and a drain, and the gate, the source, and the drain of each TFT electrically connecting to one corresponding scanning line, one corresponding data line, and one corresponding pixel electrode respectively.

In another aspect, an array substrate includes: a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines. Wherein within each of the pixel cells, ports corresponding to the intersections of at least one scanning and the two data lines and the intersections of the at least one scanning and the axis are not on the same horizontal line.

Wherein each of the pixel cells correspondingly connects to two spaced, parallel scanning lines, each of the pixel cells includes two pixel electrodes arranged at two sides of the axis, and the two pixel electrodes correspondingly connect to two scanning lines.

Wherein each of the pixel electrodes includes a first area and a second area respectively arranged at two sides of the two scanning lines.

Wherein each of the pixel cells further includes a transparent area arranged between the first area and the second area of the two pixel electrodes.

Wherein each of the pixel cells further includes two thin film transistors (TFTs) for correspondingly driving the two pixel electrodes, structures of the two TFTs are different, each of the two TFTs includes a gate, a source, and a drain, and the gate, the source, and the drain of each TFT electrically connecting to one corresponding scanning line, one corresponding data line, and one corresponding pixel electrode respectively.

In another aspect, a liquid crystal panel includes: a color filter substrate, an array substrate opposite to the color filter substrate, and a liquid crystal layer between the color filter substrate and the array substrate, the color filter substrate and the array substrate are spaced apart from each other, wherein the array substrate includes a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines.

Within each of the pixel cells, ports corresponding to the intersections of at least one scanning and the two data lines and the intersections of the at least one scanning and the axis are not on the same horizontal line.

Wherein each of the pixel cells correspondingly connects to two spaced, parallel scanning lines, each of the pixel cells includes two pixel electrodes arranged at two sides of the axis, and the two pixel electrodes correspondingly connect to two scanning lines.

Wherein each of the pixel cells further includes a transparent area arranged between the first area and the second area of the two pixel electrodes.

Wherein the color filter substrate includes black matrixes arranged correspondingly to the transparent areas.

Wherein the liquid crystal panel further includes a gate driver and a source driver, the gate driver connects to the scanning lines for providing a scanning voltage to the pixel cells, and the source driver connects to the data lines for providing a driving voltage to the pixel cells.

In view of the above, the pixel electrodes of each of the pixel cells connects to at least one scanning line and two data lines correspondingly. Each of the pixel cells is arranged symmetrically along an axis parallel to the two data lines. In this way, the ports corresponding to the intersection of the scanning lines and the adjacent data lines of each of the pixel cells are at the same height to ensure that the pixel cells may be engaged with each other precisely so as to enhance the flexibility of pixel arrangement.

DETAILED DESCRIPTION OF THE EMBODIMENTS

Embodiments of the invention will now be described more fully hereinafter with reference to the accompanying drawings, in which embodiments of the invention are shown.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

Figure 1:
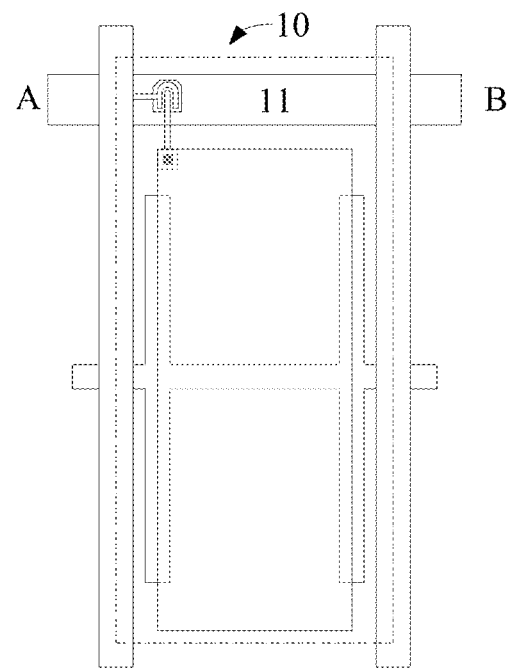
FIG. 1 is a schematic view of one conventional pixel cell.
Figure 2:
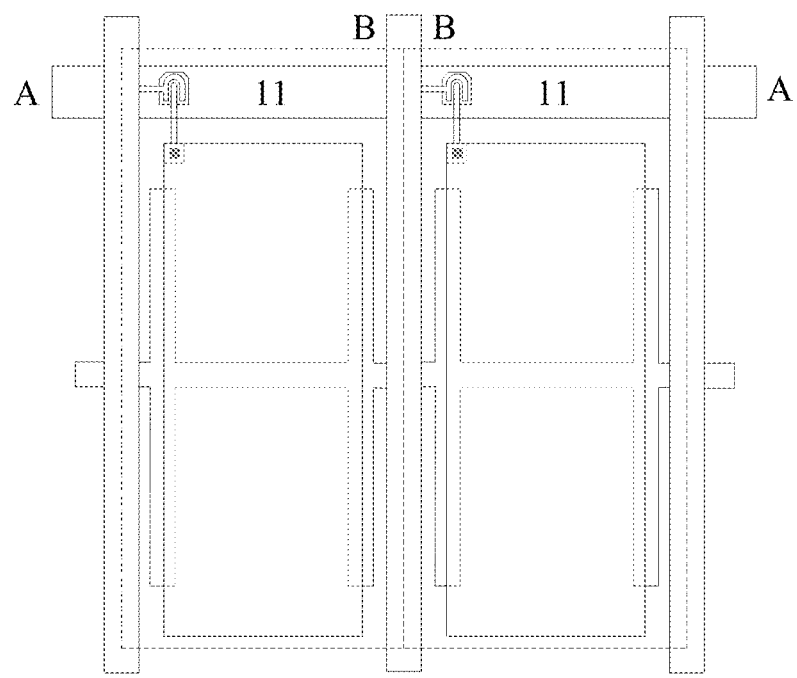
FIG. 2 is a schematic view of a pixel arrangement, in which the pixel cells of FIG. 1 are duplicatedly arranged
Figure 3:
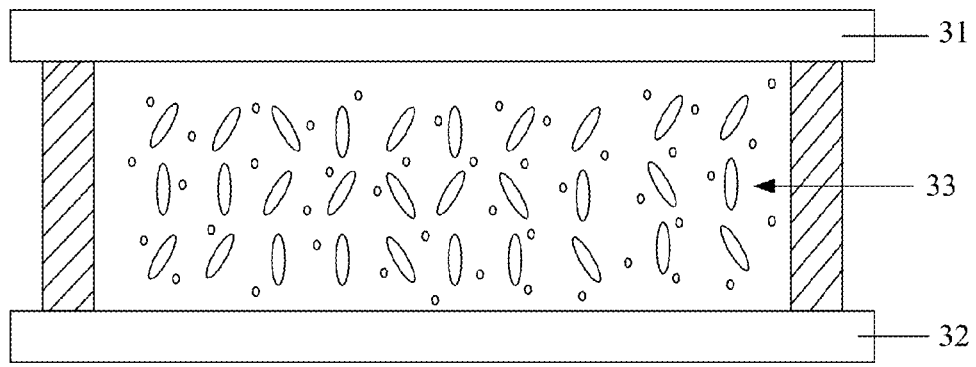
FIG. 3 is a sectional view of the liquid crystal panel in accordance with one embodiment.
Figure 4:
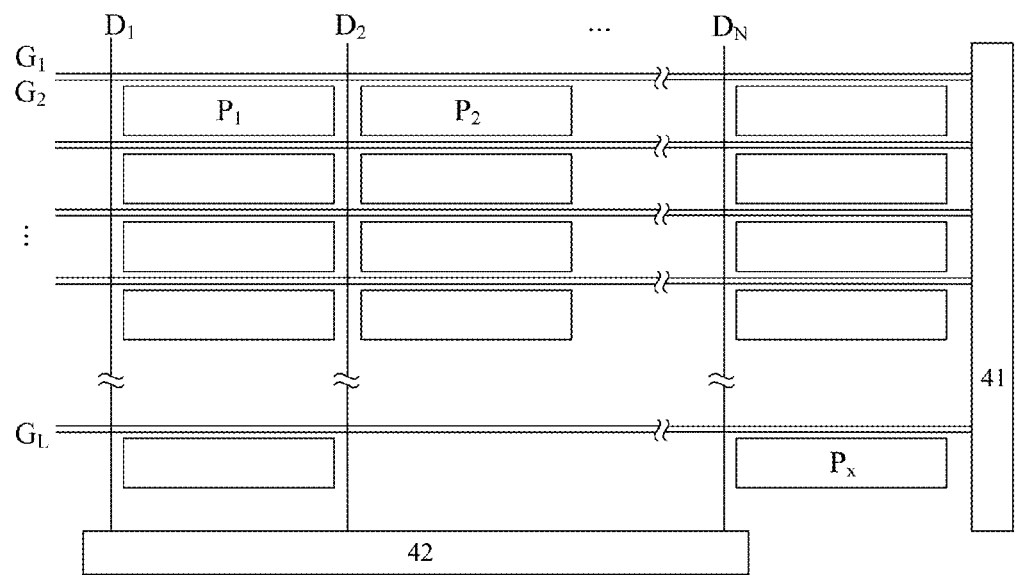
FIG. 4 is a schematic view of the pixel structure of the liquid crystal panel of FIG. 3.

FIG. 3 is a sectional view of the liquid crystal panel in accordance with one embodiment. FIG. 4 is a schematic view of the pixel structure of the liquid crystal panel of FIG. 3. Referring to FIGS. 3 and 4, the liquid crystal panel 30 includes a first substrate 31, a second substrate 32, and a liquid crystal layer 33. The first substrate 31 and the second substrate 32 are spaced apart each other and are opposite to each other. The liquid crystal layer 33 is filled between the first substrate 31 and the second substrate 32. The second substrate 32 is a color filter (CF) substrate, and the first substrate 31 is a thin film transistor (TFT) array substrate. The first substrate 31 includes a transparent substrate and a variety of wires and pixel electrodes arranged on the transparent substrate.

In one embodiment, the first substrate 31 includes a plurality of spaced, parallel data lines ($D_1, D_2, \ldots, D_N$), a plurality of scanning lines ($G_1, G_2, \ldots, G_L$) vertical to the data lines, and a plurality of pixel cells ($P_1, P_2, \ldots, P_X$) defined by the scanning lines ($G_1, G_2, \ldots, G_L$) and data lines ($D_1, D_2, \ldots, D_N$). The scanning lines ($G_1, G_2, \ldots, G_L$) connect to a gate driver 41. The data lines ($D_1, D_2, \ldots, D_N$) connect to a source driver 42. The gate driver 41 is configured for providing a scanning voltage to the pixel cells ($P_1, P_2, \ldots, P_X$). The source driver 42 is configured for providing a driving voltage to the pixel cells ($P_1, P_2, \ldots, P_X$).

In one embodiment, the pixel electrodes of each of the pixel cells of FIG. 4 connects to two data lines and two scanning lines correspondingly. In other embodiments, the pixel electrodes of each of the pixel cells may connect to two data lines and at least one scanning line. It can be understood that the number of the scanning lines may be configured in accordance with the structure of the pixel cells.

Figure 5:
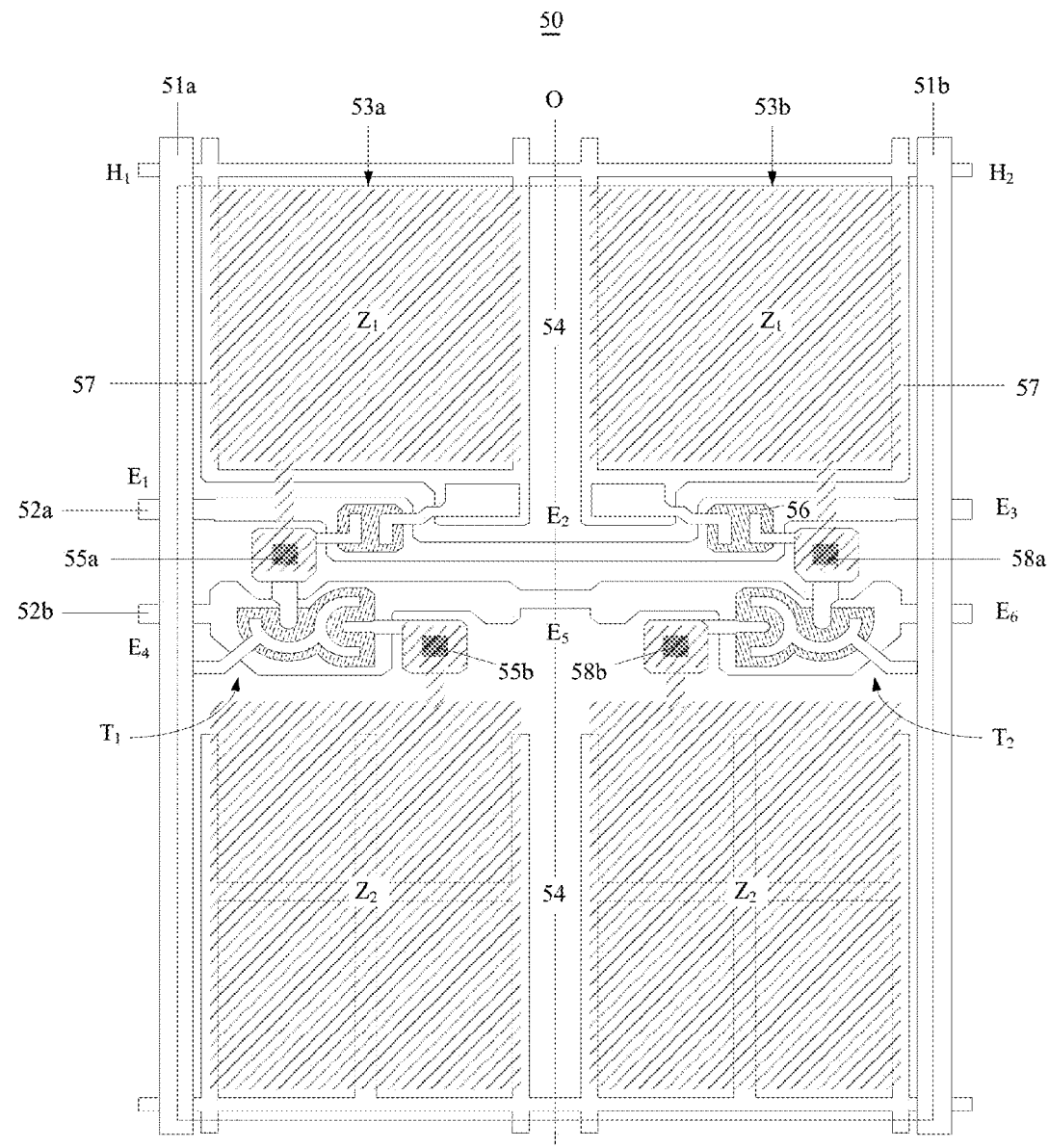
FIG. 5 is a schematic view of one pixel cell of the liquid crystal panel of FIG. 3.

FIG. 5 is a schematic view of one pixel cell of the liquid crystal panel 30. The area identified by the dashed lines relates to an operational display area of one pixel cell. As the structure of the pixel cells ($P_1, P_2, \ldots, P_X$) arranged in a matrix form are substantially the same, only the pixel cell 50 in FIG. 5 will be described as an example.

Referring to FIG. 5, the pixel cell 50 of the liquid crystal panel 30 connects to two spaced, parallel data lines 51a, 51b and two spaced, parallel scanning lines 52a, 52b correspondingly. The pixel cell 50 is arranged symmetrically along an O-axis parallel to the data lines 51a, 51b. The pixel cell 50 includes two pixel electrodes 53a, 53b respectively arranged at two sides of the O-axis, and the two pixel electrodes 53a, 53b correspondingly connects to the two scanning lines 52a, 52b.

With respect to the pixel cell 50, the ports corresponding to the intersections respectively between the two scanning lines 52, 52b and the two data lines 51a, 51b and b Within the pixel cell 50, the ports corresponding to the intersection of the two scanning lines 52a, 52b and the two data lines 51a, 51b and corresponding to the intersection of the two scanning lines 52a, 52b and the O-axis are not on the same horizontal line as described below.

The port ($E_1$) corresponding to the intersection of the scanning line 52a and the data line 51a and the port ($E_2$) corresponding to the intersection of the scanning line 52a and O-axis are not on the same horizontal line.

The port ($E_3$) corresponding to the intersection of the scanning line 52a and the data line 51b and the port ($E_2$) corresponding to the intersection of the scanning line 52a and O-axis are not on the same horizontal line.

The port ($E_4$) corresponding to the intersection of the scanning line 52b and the data line 51a and the port ($E_5$) corresponding to the intersection of the scanning line 52b and O-axis are not on the same horizontal line.

The port ($E_6$) corresponding to the intersection of the scanning line 52b and the data line 51b and the port ($E_5$) corresponding to the intersection of the scanning line 52b and O-axis are not on the same horizontal line.

It is to be noted that within the pixel cell 50, the ports corresponding to the intersection of the each scanning line and the two data lines 51a, 51b are on the same horizontal line.

The port ($E_1$) corresponding to the intersection of the scanning line 52a and the data line 51a and the port ($E_3$) corresponding to the intersection of the scanning line 52a and the data line 51b are not on the same horizontal line.

In addition, the structure of the two scanning lines 52a, 52b between the O-axis and one data line are different. That is, the structure of the scanning line 52a between the O-axis and the data line 51a is different from that of the 52b between the O-axis and the data line 51a. Also, the structure of the scanning line 52a between the O-axis and the data line 51b is different from that between the O-axis and the data line 51b.

In the embodiment, the pixel cell 50 includes two pixel electrodes 53a, 53b respectively arranged at two sides of the O-axis. Each pixel electrode includes a first area ($Z_1$) and a second area ($Z_2$). The first area ($Z_1$) and the second area ($Z_2$) of the pixel electrodes 53a, 53b respectively arranged at two sides of the scanning lines 52a, 52b. The first area ($Z_1$) of the pixel electrode 53a connects to the scanning line 52a. The second area ($Z_2$) of the pixel electrodes 53a, 53b connects to the scanning line 52b. The first area ($Z_1$) of the pixel electrode 53b connects to the scanning line 52a. The second area ($Z_2$) of the pixel electrode 53b connects to the scanning line 52b.

In addition, a transparent area 54 is arranged between the first area ($Z_1$) of the pixel electrode 53a and the first area ($Z_1$) of the pixel electrode 53b. One transparent area 54 is also arranged between the second area ($Z_2$) of the pixel electrode 53a. Correspondingly, the second substrate 32 of FIG. 3 includes two black matrixes corresponding to the two transparent areas 54. That is, the black matrixes is configured corresponding to the O-axis.

Referring to FIGS. 4 and 5, the pixel cell 50 further includes two thin film transistors ($T_1, T_2$) for correspondingly driving the pixel electrodes 53a, 53b. The structure of the thin film transistors ($T_1$, $T_2$) are different. In addition, the two thin film transistors ($T_1$, $T_2$) of each of the pixel cells ($P_1$, $P_2$, ..., $P_X$) are arranged symmetrically along the O-axis.

The thin film transistors ($T_1$, $T_2$) both include a gate, a source, and a drain. The gate of the thin film transistor (TFT) ($T_1$) electrically connects to the scanning lines 52a, 52b via through-hole layers 55a, 55b. The source of TFT ($T_1$) electrically connects to the corresponding data line 51a. The drain of TFT ($T_1$) electrically connects to the first area ($Z_1$) and second area ($Z_2$) of the pixel electrode 53a via the through-hole layers 55a, 55b. In addition, a portion of the drain of the TFT ($T_1$) electrically connects to a common electrode 57 via the through-hole layer 55a and an active layer 56 arranged on the scanning line 52a. The gate of the TFT ($T_2$) electrically connects to the scanning lines 52a, 52b via the through-hole layers 58a, 58b. The source of the TFT ($T_2$) electrically connects to corresponding data line 51b. The drain of the TFT ($T_2$) electrically connects to the first area ($Z_1$) and second area ($Z_2$) of the pixel electrode 53b via the through-hole layers 58a, 58b. In addition, a portion of the drain of the TFT ($T_2$) electrically connects to the common electrode 57 via the through-hole layer 58a and the active layer 56 arranged on the scanning line 52a.

Each of the pixel cell 50 of the liquid crystal panel 30 includes two pixel electrodes 53a, 53b symmetrically arranged along the O-axis parallel to the data lines 51a, 51b. The pixel cell 50 includes one pixel cell and another pixel cell that is symmetrical such that the ports of the intersection of the scanning lines 52a, 52b and the adjacent data lines 51a, 51b are located at the same height. In this way, the pixel cells ($P_1$, $P_2$, ..., $P_X$) may be precisely engaged with each other so as to enhance the flexibility of the pixel cell design.

In addition, as each of the pixel cell 50 is symmetrically arranged along the O-axis, which is parallel to the two data lines 51a, 51b, the ports ($H_1$, $H_2$) corresponding to the intersections of the common electrode 57 and the two adjacent data lines 51a, 51b, are located at the same height, which ensure that the pixel cells ($P_1$, $P_2$, ..., $P_X$) may be precisely engaged with each other.

Figure 6:
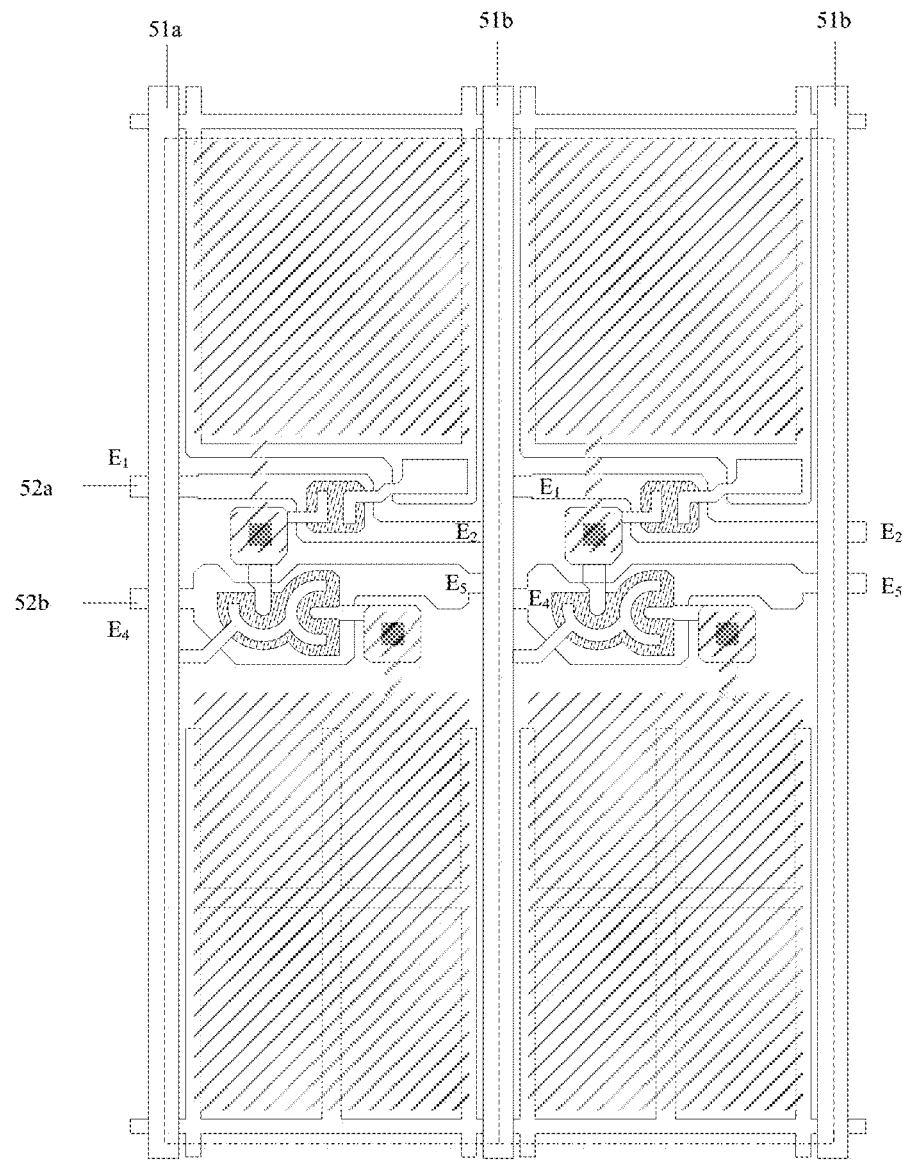
FIG. 6 is a schematic view showing the pixel arrangement of duplicatedly arranged pixel cells of FIG. 5.

Referring to FIGS. 5 and 6, if the data line 51b is arranged on the O-axis, the pixel cell is the same with one conventional pixel cell. As the port ($E_1$) corresponding to the intersection of the scanning line 52a and the data line 51a and the port ($E_2$) corresponding to the intersection of the scanning line 52a and the O-axis are not at the same height, if the pixel cells are duplicately arranged by the conventional way, the port ($E_1$) would be moved from one end of the data line 51b to the other end of the data line 51b along a horizontal direction. However, even though the port ($E_1$) is moved, the port ($E_1$) and the port ($E_2$) are still not at the same height. In addition, if the port ($E_4$) corresponding to the intersection of the scanning line 52b and the data line 51a is moved from one end of the data line 51b to the other end of the data line 51b along the horizontal direction, the port ($E_4$) and the port ($E_5$) are still not at the same height. Thus, it can be seen that the two pixel cells cannot be precisely engaged with each other while the conventional arrangement is adopted. Otherwise, the structures of the two scanning lines of each of the pixel cells have to be re-designed.

Figure 7:
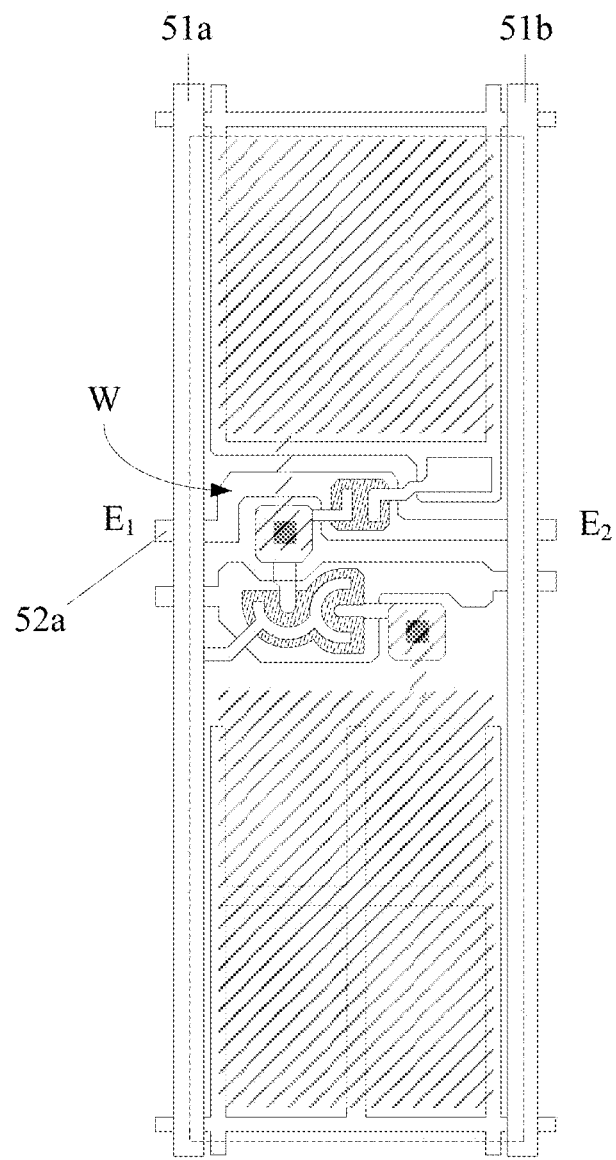
FIG. 7 is a schematic view showing a bending corner area of the scanning lines connected with the pixel cells of FIG. 5.

Referring to FIG. 7, a bending corner area (W) is added to scanning line, which is equivalent to the scanning line 52a of FIG. 5 such that the port ($E_1$) corresponding to the intersection of the scanning line 52a and the data line 51a is moved down until the port ($E_1$) and the port ($E_2$) corresponding to the intersection of the scanning line 52a and the data line 51b are at the same height. However, the bending corner area (W) may increase the resistance of the scanning line 52a. When providing a normal scanning voltage for the scanning line 52a, the gate driver 41 needs to output a larger voltage, which consumes more power energy. In view of the above, the structure of the scanning line 52a has not to be changed by incorporating two symmetrical pixels into one pixel cell. As such, the resistance of the scanning line 52a has not be increased.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising:
a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines;
within each of the pixel cells, ports corresponding to the intersections of at least one scanning and the two data lines and the intersections of the at least one scanning and the axis are not on the same horizontal line; and
wherein each of the pixel cells correspondingly connects to two spaced, parallel scanning lines, each of the pixel cells comprises two pixel electrodes arranged at two sides of the axis, and the two pixel electrodes correspondingly connect to two scanning lines.

2. The array substrate as claimed in claim 1, wherein each of the pixel electrodes comprises a first area and a second area respectively arranged at two sides of the two scanning lines.

3. The array substrate as claimed in claim 2, wherein each of the pixel cells further comprises a transparent area arranged between the first area and the second area of the two pixel electrodes.

4. The array substrate as claimed in claim 1, wherein each of the pixel cells further comprises two thin film transistors (TFTs) for correspondingly driving the two pixel electrodes, structures of the two TFTs are different, each of the two TFTs comprises a gate, a source, and a drain, and the gate, the source, and the drain of each TFT electrically connecting to one corresponding scanning line, one corresponding data line, and one corresponding pixel electrodes respectively.

5. An array substrate, comprising:
a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines.

6. The array substrate as claimed in claim 5, wherein within each of the pixel cells, ports corresponding to the intersections of at least one scanning and the two data lines and the intersections of the at least one scanning and the axis are not on the same horizontal line.

7. The array substrate as claimed in claim 5, wherein each of the pixel cells correspondingly connects to two spaced, parallel scanning lines, each of the pixel cells comprises two pixel electrodes arranged at two sides of the axis, and the two pixel electrodes correspondingly connect to two scanning lines.

8. The array substrate as claimed in claim 7, wherein each of the pixel electrodes comprises a first area and a second area respectively arranged at two sides of the two scanning lines.

9. The array substrate as claimed in claim 8, wherein each of the pixel cells further comprises a transparent area arranged between the first area and the second area of the two pixel electrodes.

10. The array substrate as claimed in claim 7, wherein each of the pixel cells further comprises two thin film transistors (TFTs) for correspondingly driving the two pixel electrodes, structures of the two TFTs are different, each of the two TFTs comprises a gate, a source, and a drain, and the gate, the source, and the drain of each TFT electrically connecting to one corresponding scanning line, one corresponding data line, and one corresponding pixel electrodes respectively.

11. A liquid crystal panel, comprising:
a color filter substrate, an array substrate opposite to the color filter substrate, and a liquid crystal layer between the color filter substrate and the array substrate, the color filter substrate and the array substrate are spaced apart from each other, wherein the array substrate comprises a plurality of pixel cells, pixel electrodes of each of the pixel cells connect to at least one scanning line and two data lines correspondingly, the two data lines are parallel and spaced apart from each other, and each of the pixel cells is arranged symmetrically along an axis parallel to the two data lines.

12. The liquid crystal panel as claimed in claim 11, within each of the pixel cells, ports corresponding to the intersections of at least one scanning and the two data lines and the intersections of the at least one scanning and the axis are not on the same horizontal line.

13. The liquid crystal panel as claimed in claim 11, wherein each of the pixel cells correspondingly connects to two spaced, parallel scanning lines, each of the pixel cells comprises two pixel electrodes arranged at two sides of the axis, and the two pixel electrodes correspondingly connect to two scanning lines.

14. The liquid crystal panel as claimed in claim 13, wherein each of the pixel cells further comprises a transparent area arranged between the first area and the second area of the two pixel electrodes.

15. The liquid crystal panel as claimed in claim 14, wherein the color filter substrate comprises black matrixes arranged correspondingly to the transparent areas.

16. The liquid crystal panel as claimed in claim 11, wherein the liquid crystal panel further comprises a gate driver and a source driver, the gate driver connects to the scanning lines for providing a scanning voltage to the pixel cells, and the source driver connects to the data lines for providing a driving voltage to the pixel cells.

* * * * *